United States Patent [19]

Hutchens

[11] Patent Number: 5,131,666
[45] Date of Patent: Jul. 21, 1992

[54] ZERO CLEARANCE ANTI-EXTRUSION RINGS FOR CONTAINMENT OF PTFE PACKING

[75] Inventor: Wilbur D. Hutchens, Marshalltown, Iowa

[73] Assignee: Fisher Controls International, Inc., Clayton, Mo.

[21] Appl. No.: 596,225

[22] Filed: Oct. 12, 1990

[51] Int. Cl.$^5$ .............. F16J 15/20; F16L 21/04; B65D 53/02
[52] U.S. Cl. .............. 277/124; 277/125; 277/188 A; 277/216; 251/214
[58] Field of Search .............. 277/123, 124, 188 A, 277/220, 221, 222, DIG. 6, 216, 125, 205; 251/214

[56] References Cited

U.S. PATENT DOCUMENTS

| | | |
|---|---|---|
| 687,489 | 11/1901 | Reichenbach ............... 277/221 |
| 2,815,973 | 12/1957 | Jackson ................... 277/188 A |
| 3,239,191 | 3/1966 | Widera ..................... 251/288 |
| 3,421,769 | 1/1969 | Boop et al. ................ 277/216 |
| 3,787,060 | 1/1974 | Astill et al. ................ 277/69 |
| 3,789,879 | 2/1974 | Hale ..................... 137/614.11 |
| 3,916,943 | 11/1975 | Hester et al. .............. 137/375 |
| 4,032,159 | 6/1977 | Zitting ................... 277/188 A X |
| 4,234,197 | 11/1980 | Amancharla ........... 277/DIG. 6 X |
| 4,380,342 | 4/1983 | Fling .................... 277/188 A |
| 4,406,469 | 9/1983 | Allison ................. 277/188 A X |
| 4,428,590 | 1/1984 | Pippert et al. ............ 277/188 A |
| 4,433,847 | 2/1984 | Weinberg ................. 277/125 |
| 4,451,047 | 5/1984 | Herd et al. ........... 277/DIG. 6 X |
| 4,516,752 | 5/1985 | Babbitt et al. ............. 251/214 |
| 4,558,874 | 12/1985 | Williams et al. ............ 277/112 |
| 4,576,385 | 3/1986 | Ungchusri et al. ......... 277/125 X |
| 4,618,154 | 10/1986 | Freudenthal .............. 277/205 |
| 4,741,509 | 5/1988 | Bunch e al. ............. 277/205 X |
| 4,807,890 | 2/1989 | Gorman et al. ........... 277/222 X |
| 4,809,992 | 3/1989 | Kemp, Jr. et al. ......... 277/220 X |
| 4,826,181 | 5/1989 | Howard ................ 277/DIG. 6 |
| 4,840,379 | 6/1989 | Thoman, Jr. .............. 277/222 |
| 4,844,487 | 7/1989 | Eakin ..................... 277/221 |
| 4,867,197 | 9/1989 | Ritter et al. .............. 137/315 |
| 4,879,338 | 11/1989 | Mercer et al. ........... 522/134 X |
| 4,886,241 | 12/1989 | Davis et al. ............ 277/188 A X |
| 4,991,495 | 2/1991 | Loegal, Sr. et al. ......... 277/73 X |

FOREIGN PATENT DOCUMENTS

| | | | |
|---|---|---|---|
| 2009338 | 6/1979 | United Kingdom | 277/124 |
| 2202283 | 9/1988 | United Kingdom | 277/DIG. 6 |

OTHER PUBLICATIONS

Encyclopedia of Polymer Science and Engineering, vol. 6, pp.103-104, John Wiley & Sons, New York, 1986.
Handbook of Mechanical Packings and Gasket Materials, Mechanical Packing Assoc., New York, 1960.
Precision Rubber Products Corporation, Design Manual, "Gland Design", pp. 8-10.

Primary Examiner—William A. Cuchlinski, Jr.
Assistant Examiner—James K. Folker
Attorney, Agent, or Firm—Marshall, O'Toole, Gerstein, Murray & Bicknell

[57] ABSTRACT

A packing containment assembly for sealing an operating member such as a shaft or stem in a fluid control valve, particularly where PTFE packing is used. A pair of zero clearance anti-extrusion rings of PEEK material are mounted in the shaft with the PTFE packing therebetween. Each ring has an inner diameter slightly less than the shaft outer diameter to form an interference fit. The rings are split with a scarf cut to provide an overlapping joint and enable mounting of the rings on the operating member. A male adapter PEEK ring matches a V-type female packing ring which significantly reduces the amount of PTFE packing needed for a reliable seal. A step cut PEEK zero clearance anti-extrusion ring could be used as well as a fractured carbon ring.

13 Claims, 3 Drawing Sheets

ZERO CLEARANCE ANTI-EXTRUSION RINGS FOR CONTAINMENT OF PTFE PACKING

This invention relates to packing containments for sealing operating members in a housing with fluids, and in particular to a packing containment assembly for preventing packing extrusions at high pressures and high temperatures.

BACKGROUND OF THE INVENTION

Packing material is widely used to prevent fluid leakage around an operating member in a housing with fluid, such as a rotary shaft or a sliding stem in fluid control valves or in a reciprocating pump shaft. Normally such packing is formed of a resilient member and is placed under a static load by being bolted into position within a packing box around the operating member. In other instances the packing is subjected to spring loading in what is known as a live loaded packing configuration. Live loaded packing is particularly useful in attempting to prevent leakage of undesired fluids into the environment. Also, it is desired to use commonly available packing material formed of polytetrafluoroethylene (PTFE) because of the inertness of such material and its low frictional impact on an operating member.

However, it has been found that in attempts to use PTFE packing in a live loaded packing configuration where the PTFE packing is continually loaded to a stress level, i.e., 2,000-4,000 psi, (13790-27580 kPa) that the PTFE packing is caused to cold flow and extrude out of the sealing area. On the other hand, it is normally required to continually load the PTFE packing in the containment assembly in order to enable the packing to set in and maintain a tight seal against the operating member. Generally, it has been found necessary to continually load PTFE packing when operating at environmentally high pressures of about 1,000-2000 psi (6895-13790 kPa) which leads to undesired PTFE packing extrusion, fluid leakage, and increased wear and possible damage to the operating member.

Another problem which arises in the use of PTFE packing material is due to its thermal expansion characteristic which is approximately ten times that of metal. Thus, the volumetric expansion of PTFE packing must be considered in determining the amount of spring travel of the live loading configuration which is required to maintain an adequate load on the packing after it has been through a thermal cycle. This is a particular problem at high temperature operating conditions, i.e., at temperatures in excess of 250° F. (121° C.).

Prior attempts to solve the PTFE extrusion problem with anti-extrusion devices such as flat ring members on each side of the PTFE packing and having a tight fit with the operating member such as a valve stem, have not eliminated the problem where stringent emission control requirements must be met. If the ring-to-stem fit is made extremely tight to prevent extrusion, this causes difficulty in assembling the ring on the stem or shaft, an undue amount of stem friction, and can lead to a lockup of the valve stem or operating member. Reducing the tightness fit between the ring member and the valve stem eases assembly and reduces the friction but leads to PTFE extrusion in an amount which does not meet stringent fluid emission control requirements for certain fluids.

Accordingly, it is desired to provide a packing containment assembly with anti-extrusion provisions which prevents the extrusion of PTFE packing material and meets stringent fluid leakage control requirements while still enabling proper operation of the operating member being sealed by the packing material. In addition, it is desired to provide an improved packing arrangement enabling the amount of PTFE in the packing to be reduced which is particularly desirable when operating in environmental conditions of high temperature.

SUMMARY OF THE INVENTION

In accordance with the principles of the present invention, there is provided an improved packing containment assembly with anti-extrusion provisions for use with PTFE packing for sealing an operating member in a housing with fluid, such as in a sliding stem valve, rotary shaft valve, or reciprocating pump shaft. PTFE packing is sandwiched between opposite anti-extrusion rings, wherein each ring is a "zero clearance" ring having an inner diameter slightly less than the outside diameter of the operating member to form an interference fit with the operating member. The zero clearance anti-extrusion ring includes a scarf cut through the ring, i.e., where the ring has been split or separated so that the separation on one face of the ring is laterally disposed from the separation on the opposite surface of the ring.

Splitting of the ring enables the zero clearance ring to be assembled on the operating member with an interference fit. In the preferred embodiment of providing a scarf cut, the ring is cut in an angle or in the form of an overlap step cut.

The outside diameter of the ring is formed slightly smaller than the packing bore in the housing. A zero clearance anti-extrusion ring formed in the above-identified manner is enabled to move freely along the operating member while maintaining an interference fit between the outside diameter of the operating member and the ring inside diameter to prevent extrusion of the PTFE packing material. It has been found to be important to enable the anti-extrusion ring in accordance with the present invention to axially move along the operating member so as to transmit the gland loading to the packing.

In another embodiment of the invention, a zero clearance anti-extrusion ring is formed in the shape of a male adapter portion of a normal PTFE packing ring assembly and is also provided with a scarf cut as previously described. It has been found that using a zero clearance anti-extrusion ring having the shape of a male adapter in a normal PTFE packing arrangement in accordance with the present invention enables the volume of PTFE in the packing arrangement to be reduced. A scarf cut, zero clearance male adapter ring is particularly useful in a double packing configuration to maintain the load to the lower packing set and to desirably reduce the amount of PTFE in the packing box. Only a respective female PTFE packing member is needed in each double packing.

Anti-extrusion rings in accordance with the present invention are particularly desirable because the ring is not contained volumetrically in the packing box. Therefore, only the linear expansion of the anti-extrusion ring material needs to be considered when determining the spring travel required on the live load packing system.

It has been found that a polymer material other than PTFE should be used for the zero clearance anti-extrusion ring in accordance with the present invention. In particular, it is preferred to form the zero clearance anti-extrusion rings with a high compressive strength linear aromatic polymer such as polyetheretherketone (PEEK). In addition to a high compressive strength linear polymer, other polymers, other than PTFE, can be utilized as well as other material other than PTFE can be utilized if the material has the following characteristics:

1. Exhibits a higher strength than PTFE;
2. Has less deformation under load than PTFE; and
3. Has compatible wear characteristics to the operating valve or pump member.

BRIEF DESCRIPTION OF THE DRAWINGS

The features of this invention which are believed to be novel are set forth with particularity in the appended claims. The invention may be best understood by reference to the following description taken in conjunction with the accompanying drawings, in which like reference numerals identify like elements in the several figures and in which:

DETAILED DESCRIPTION

Figure 1:
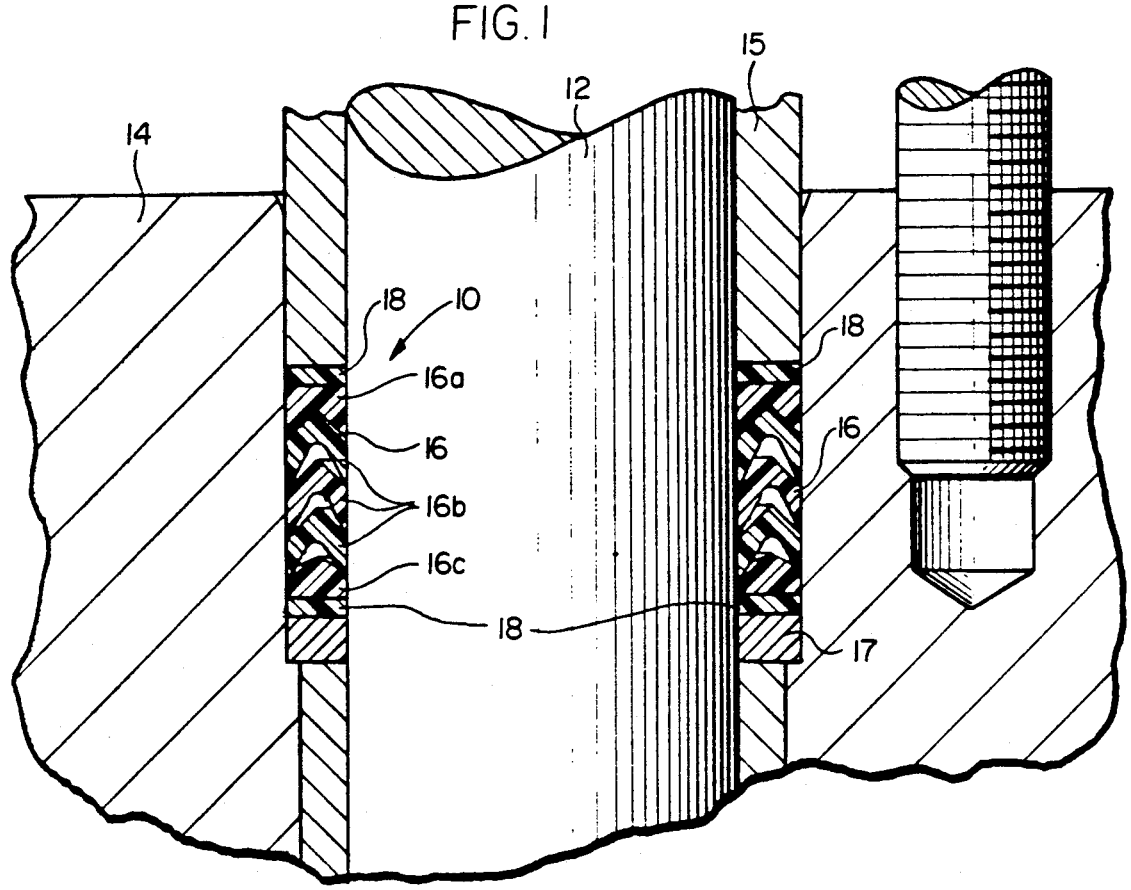
FIG. 1 is a sectional view illustrating a packing containment for sealing a rotary shaft valve with zero clearance anti-extrusion rings constructed in accordance with the present invention.
Figure 2:
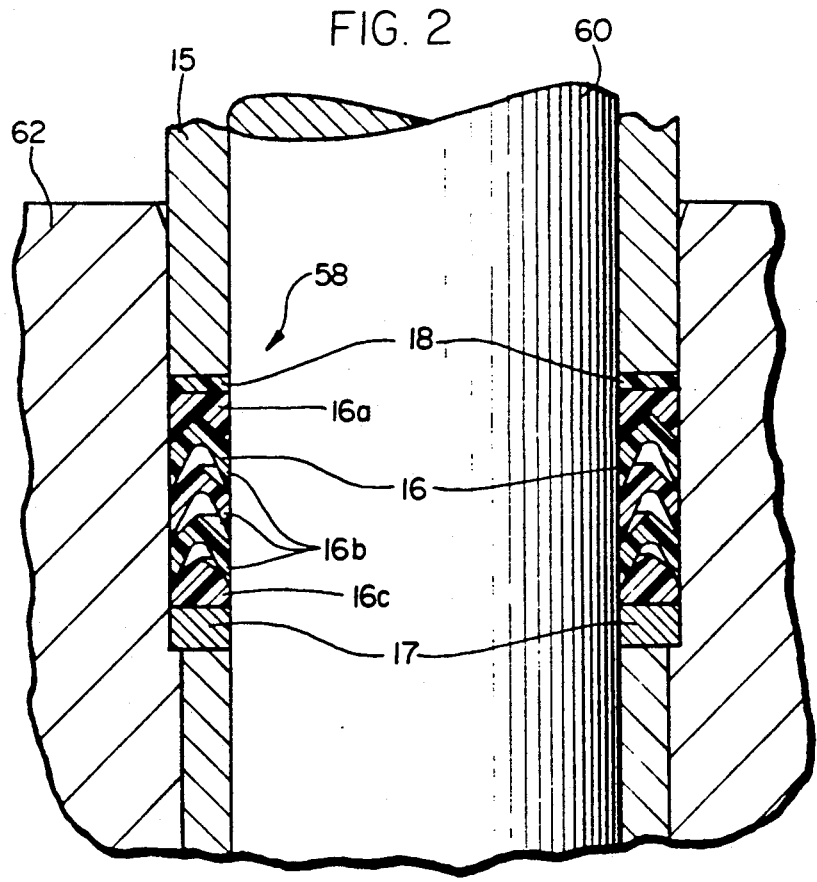
FIG. 2 is a sectional view of another embodiment of the invention illustrating a packing containment with a zero clearance male adapter anti-extrusion ring.
Figure 3:
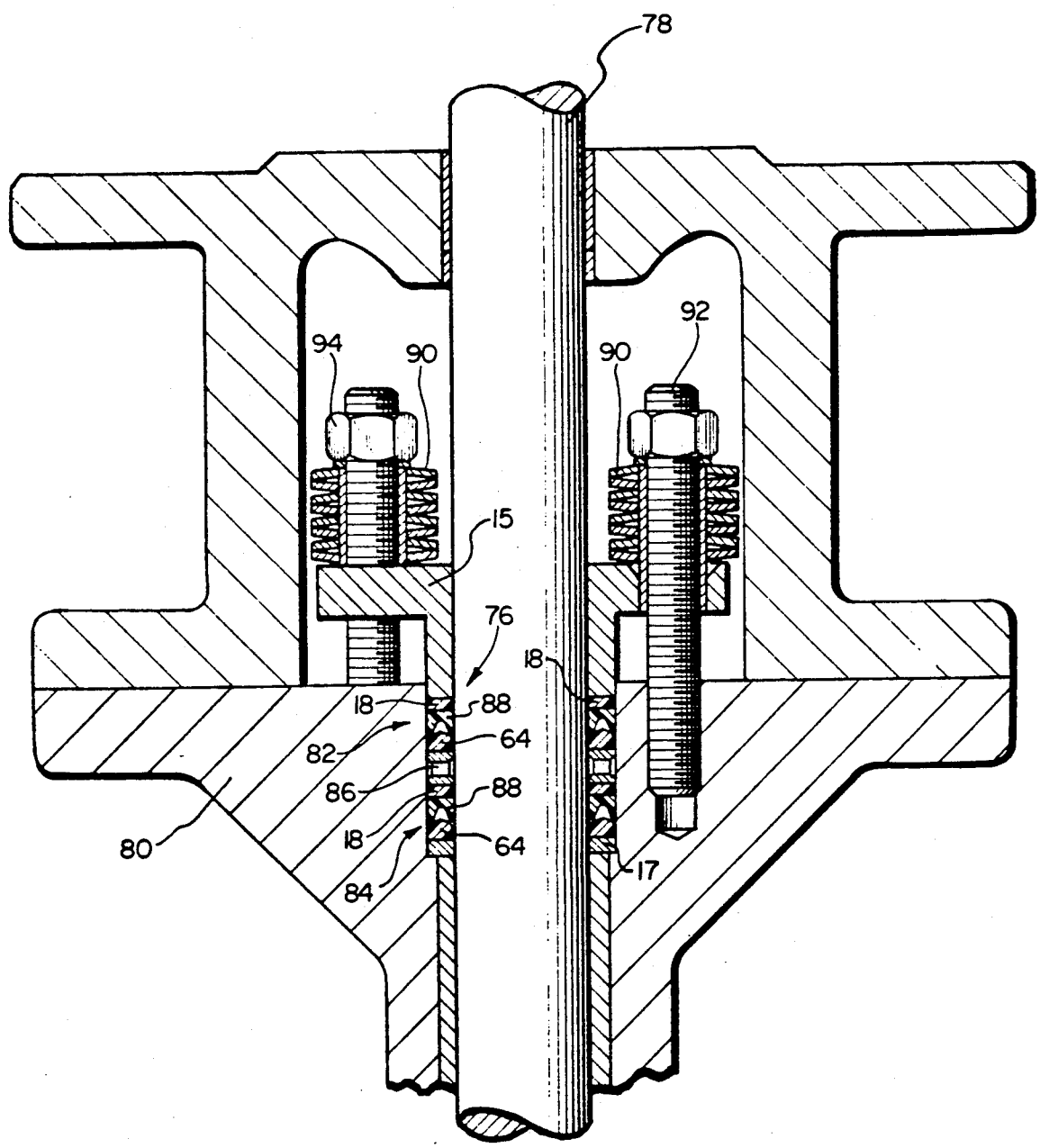
FIG. 3 is a sectional view of another embodiment illustrating a double packing containment assembly in a live loaded packing condition.

Referring now to the drawings, FIGS. 1 and 2 illustrate zero clearance anti-extrusion rings for containment of PTFE packing in a single packing configuration in accordance with one aspect of the present invention. FIG. 3 illustrates zero clearance anti-extrusion rings for containment of PTFE packing in a double packing configuration in accordance with another aspect of the present invention. FIG. 3 illustrates a live loaded packing structure. It is to be understood that the packing configurations shown in FIGS. 1 and 2 are also subjected to either a live loaded condition or a conventional static loaded system.

Furthermore, each of the packing containment illustrations of FIGS. 1-3 in accordance with the principles of the present invention can handle PTFE packing stresses under continually loaded conditions to a stress level of 2,000 to 4,000 psi (13790-27580 kPa). Under such high stress levels, PTFE packing would normally cold flow and extrude out of the sealing area of conventional packing box designs. The reliable sealing feature of the present invention is especially important where toxic fluids are being handled by a fluid valve or a pump and in other similar strict fluid leakage requirements.

It is also to be understood that the invention is illustrated herein in connection with a rotary shaft valve for purposes of illustration only, whereas the principles of the invention are also applicable to sliding stem valves, pumps and to other devices in which an operating member is moving in a housing and the operating member is to be sealed from fluid passing through or contained within the housing.

Referring now to FIG. 1, there is illustrated a packing containment 10 in accordance with the present invention for sealing an operating member from a housing, such as a rotary shaft 12 within valve body housing 14. A packing 16 surrounds valve stem 12 and is formed of a series of rings of the type commonly referred to as V-type packing. As shown in FIG. 1, there are five V-rings in packing 16, including a top female ring 16a; three identical middle rings 16b; and a bottom male ring 16c. V-type packing 16 is formed of PTFE (polytetrafluorethylene - a synthetic resin polymer) and therefore packing 16 is known in the trade as "V-type PTFE packing".

Packing suitably formed of other material, or of other synthetic resin polymers having properties similar to PTFE, i.e., low elasticity, low frictional coefficient and good lubricating characteristics, may be utilized. However, the present invention is particularly useful where PTFE packing is desired because of its inertness and low friction characteristics. PTFE packing 16 is maintained under suitable loading in the packing bore by means of a packing follower 15 at one end and a packing box ring 17 at the other end.

Normally, PTFE packing 16 under continually loaded stress level conditions of 2,000 to 4,000 psi (13790-27580 kPa) would begin to cold flow and extrude out of the sealing area thereby causing fluid leakage. However, in accordance with the present invention, two zero clearance anti-extrusion rings 18 on opposite sides of packing 16 enable the continuous loading of PTFE packing 16 to these higher stress levels and still maintains a tight seal at valve fluid operating pressures of 1,000-2,000 psi (6895-13790 kPa). Each zero clearance anti-extrusion ring 18 is formed of a high strength polymer material with an inner diameter slightly less than the outer diameter of shaft 12. Each ring 18 is also split with an angled scarf cut to enable radial interference with shaft 12 while enabling the ring to be readily assembled on shaft 12. In addition, the outer diameter of zero clearance anti-extrusion rings 18 is slightly smaller than the packing bore within valve housing 14.

The above requirements of a zero clearance anti-extrusion ring 18 in accordance with the present invention assures there is always zero clearance or an interference fit between the outside diameter of shaft 12 and the ring inside diameter to prevent extrusion of the PTFE packing material while still enabling the anti-extrusion rings to move axially along the shaft. The ability of the anti-extrusion rings to move freely along the shaft is necessary for the following reasons:

(1) To allow the live loaded packing follower to follow the movement of the PTFE packing that occurs when the packing is subjected to thermal cycles; and (2) To maintain the load to the lower packing set in a double packing configuration. Accordingly, rings 18 are not contained volumetrically and therefore only the linear expansion of the ring material needs to be considered when determining the spring travel required in a live load packing system.

It is preferred that rings 18 be formed of a polymer material having a higher strength than PTFE with less deformation under load than PTFE and with a material that is compatible in wear characteristics with shaft 12. It is preferred to use anti-extrusion rings 18 formed of a high compressive strength linear polymer such as polyetheretherketone (PEEK). Other materials to form rings 18 may also be used such as a properly formed carbon ring or even a metal ring if the metal has compatible wear characteristics with the shaft.

Figure 4:
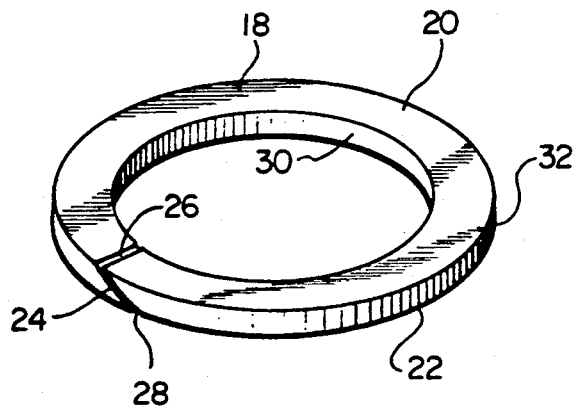
FIG. 4 is a perspective view illustrating a preferred embodiment of a flat, scarf cut, zero clearance anti-extrusion ring according to the invention.

FIG. 4 illustrates a flat, scarf cut, zero clearance anti-extrusion ring 18 in accordance with the principles of the present invention. Upper surface 20 and opposite surface 22 are parallel to each other. Ring 18 is split by means of a scarf cut 24 caused by a cutting tool placed at an angle to the plane of ring 18 to form an overlapping joint. Cut line 26 at top surface 20 is laterally displaced from cut line 28 on bottom surface 22. Also, as described previously, inner surface 30 of ring 18 is machined so that the ring inner diameter is slightly less than the outer diameter of shaft 12. Scarf cut 24 permits ready assembly of ring 18 onto shaft 12 such that there will be a zero clearance, interference fit between the shaft outer diameter and the ring inner diameter. Also, ring outer surface 32 is machined to have an outer diameter slightly less than the packing bore diameter within valve housing 14.

Figure 5:
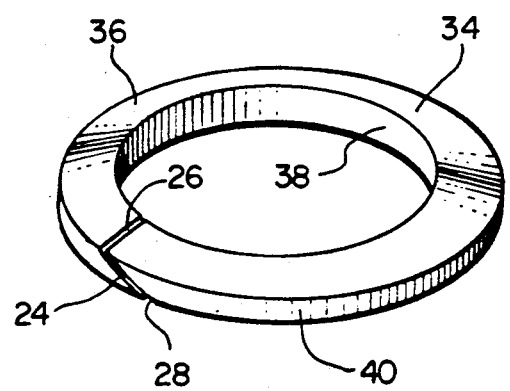
FIG. 5 is a perspective view of another embodiment of a scarf cut, zero clearance anti-extrusion ring having a wedge face upper surface.

FIG. 5 illustrates another embodiment of a zero clearance anti-extrusion ring 34 similar in all respects to ring 18 shown in FIG. 4 except that surface 36 is wedge shaped in that inner ring surface 38 is thicker than outer surface 40. Wedge shaped surface 36 may aid in enabling PTFE packing 16 to provide additional loading of the anti-extrusion ring against the shaft.

Figure 6:
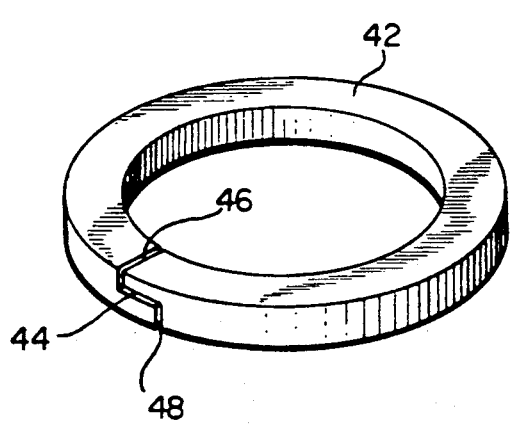
FIG. 6 is a perspective view of another embodiment of the invention illustrating a step cut, zero clearance anti-extrusion ring.
Figure 7:
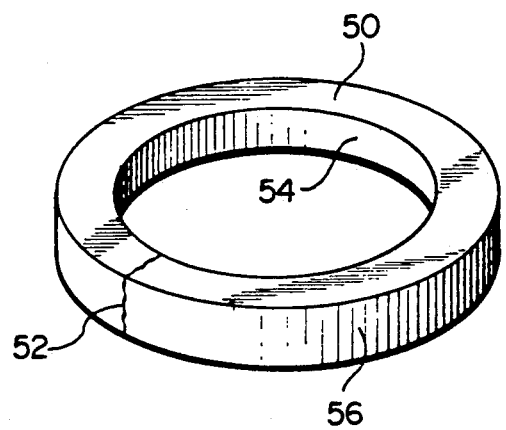
FIG. 7 is a perspective view illustrating another zero clearance anti-extrusion ring incorporating a fracture in accordance with another embodiment of the invention.

FIG. 6 illustrates still another embodiment of a zero clearance anti-extrusion ring 42 in accordance with the present invention. Ring 42 is similar in all respects to ring 18 shown in FIG. 4 except that ring 42 is split by means of a step cut 44 instead of an angled scarf cut to form an overlapping joint. Step cut 44 may be provided so that cut 46 on one surface is laterally displaced from cut 48 on the opposite ring surface.

As indicated previously, it is preferred that rings 18, 34 and 42 be formed of a high compressive strength linear polymer such as PEEK. If desired, a zero clearance anti-extrusion ring in accordance with the present invention may also be provided by a carbon ring 50 which is scored and split by means of a fracture 52 to form a non-overlapping butt joint. Ring 50 has an inner surface 54 formed with an inner diameter slightly less than the diameter of shaft 12 and an outer surface 56 with a diameter slightly less than the packing bore in valve housing 14 similar to the construction of rings 18, 34 and 42. Also, fracture 52 enables carbon ring 50 to be inserted onto an operating member with a zero clearance or interference fit with the operating member while still permitting axial movement on the operating member and thereby transmitting gland loading to the packing.

FIG. 2 illustrates another single packing configuration utilizing zero clearance anti-extrusion wiper rings 65 in a packing containment 58 for a valve shaft 60 within a valve housing 62. Packing containment 58 includes V-type packing rings 16 bounded by a zero clearance anti-extrusion wiper ring 18 and a zero clearance anti-extrusion ring 64. PTFE packing 16 includes a top female ring 16a and three identical middle rings 16b. The normal male PTFE ring 16c (FIG. 1) is replaced by a zero clearance anti-extrusion ring 64 formed in accordance with the principles of the present invention as described with respect to rings 18 but having the shape of a normal male bottom ring such as ring 16c shown in FIG. 1.

Figure 8:
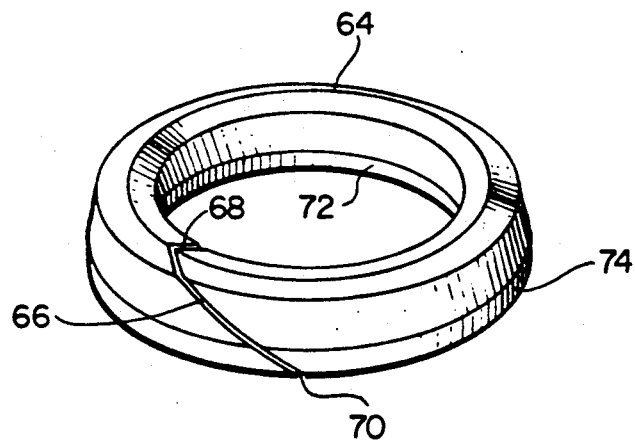
FIG. 8 is a perspective view of still another embodiment of a zero clearance anti-extrusion ring comprising a scarf cut, male adapter ring for PTFE packing.

Reference may be made to FIG. 8, wherein there is shown a zero clearance anti-extrusion ring in the form of male adapter ring 64 split in two by means of a scarf cut 66 such that cut 68 on one ring surface is circumferentially displaced from cut 70 on an opposite ring surface. Inner surface 72 and outer surface 74 are dimensioned in accordance with the invention as previously described in connection with surfaces 30 and 32 of ring 18. Also, it is preferred that male adapter ring 64 is formed of PEEK material.

Anti-extrusion ring 64 having the shape of a male adapter in a normal PTFE packing configuration allows the number of PTFE rings in the packing configuration to be reduced. This is desirable because the thermal expansion of PTFE packing material is about 10 times that of the metal packing box and volumetric expansion of the PTFE packing must be considered in determining the amount of spring travel required to maintain adequate load on the packing after it has been through a thermal cycle. Thus, while the FIG. 2 illustration with packing ring 64 shows four PTFE packing rings (i.e., upper female ring 16a and three identical middle PTFE rings 16b) it is understood that if desired, less than the illustrated four PTFE rings can be utilized with zero clearance anti-extrusion ring 64. This is particularly important and useful in a double packing configuration operating in high temperature conditions.

For instance, reference may be made to FIG. 3, wherein there is illustrated a packing configuration 76 for sealing an operating member such as a rotary shaft 78 in a housing such as valve housing 80. Packing configuration 76 includes an upper packing 82 and a lower packing 84 separated by a lantern ring 86. Packing 82 and 84 are identical and each includes an upper female PTFE V-type packing ring 88. Both packing 82 and 84 are bounded by a zero clearance anti-extrusion ring 18 on one side and a zero clearance anti-extrusion ring 64 on the other side of the packing. Packing configuration 76 in accordance with the present invention significantly reduces the number of PTFE packing rings and therefore reduces the amount of PTFE required to maintain a reliable seal of shaft 78.

In FIG. 3, live loading of the packing is provided by means of a series of Belleville springs 90 each mounted around a packing stud 92 which in turn is mounted into valve housing 80. Initial adjustment of the loading on packing 82 and 84 is provided by means of adjusting packing nuts 94 on studs 92 to apply loading directly onto packing follower 15.

The foregoing detailed description has been given for clearness of understanding only, and no unnecessary limitations should be understood therefrom, as modifications will be obvious to those skilled in the art.

What is claimed is:

1. A packing containment assembly for sealing an operating member in a housing with fluid, said assembly being subjected to changing thermal conditions and comprising:

polymer packing surrounding and in fluid sealing engagement with said operating member and said housing to inhibit fluid from leaking around said operating member, said polymer packing moving axially on said operating member in response to said changing thermal conditions;

loading means for exerting and maintaining a load on said polymer packing; and restraining ring means for permitting said polymer packing to expand and contract axially in response to said changing thermal conditions while, (a) enabling said loading means to follow said polymer packing axial movement during said changing thermal conditions to maintain said fluid sealing engagement, and (b) inhibiting extrusion of said polymer packing, said restraining ring means including, a pair of zero clearance anti-extrusions rings mounted on said operating member with a respective ring on each opposite end of said polymer packing being subjected to said loading means, each of said rings including, (1) an inside diameter slightly less than the outside diameter of said operating member to form an interference fit between said ring and said operating member to prevent extrusion of said polymer packing between said inner diameter and the operating member, (2) an outside diameter slightly less than the inside diameter of said housing sufficient to enable free axial movement of said ring outer diameter with respect to said housing and enable said loading means to follow any movement of said polymer packing in response to said changing thermal conditions, and (3) ring splitting means through said ring circumference for enabling mounting of said ring on said operating member and enabling free axial movement of said ring inner diameter with respect to said operating member so that said loading means can follow any movement of said polymer packing in response to said changing thermal conditions.

2. A packing containment assembly according to claim 1, wherein said polymer packing is formed of PTFE, and said zero clearance anti-extrusion rings are each formed of a polymer other than PTFE with higher strength characteristics than PTFE, and wherein said loading means includes live loading means for spring loading said polymer packing through said anti-extrusion rings.

3. A packing containment assembly according to claim 2, wherein each of said zero clearance anti-extrusion rings is formed of a high compressive strength linear polymer, and said ring splitting means comprises a scarf cut wherein the ends of said scarf cut on axially disposed opposite surfaces of said ring are laterally offset to provide an overlapping joint.

4. A packing containment assembly according to claim 3, wherein each of said zero clearance anti-extrusion rings is formed of PEEK.

5. A packing containment assembly according to claim 4, wherein at least one of said zero clearance anti-extrusion rings is formed with parallel, axially disposed surfaces containing said scarf cut.

6. A packing containment assembly according to claim 5, wherein said ring splitting means through at least one of said zero clearance anti-extrusion rings is a scarf cut in the form of a step cut providing said overlapping joint.

7. A packing containment assembly according to claim 4, wherein at least one of said zero clearance anti-extrusion rings is formed with angularly disposed, axially opposite surfaces.

8. A packing containment assembly according to claim 4, wherein said PTFE packing includes at least one V-type female packing ring, and at least one of said zero clearance anti-extrusion rings comprises a V-type male ring for matchingly engaging said V-type female packing ring.

9. A packing containment assembly according to claim 8, including a second set of said PTFE packing spacially separated from said first PTFE packing on said operating member, a lantern ring mounted on said operating member intermediate said two sets of PTFE packing, and a second pair of said zero clearance anti-extrusion rings with a respective ring on each opposite end of said second set of PTFE packing.

10. A packing containment assembly according to claim 1, wherein said polymer packing is formed of PTFE, and said zero clearance anti-extrusion rings are each formed of carbon, and said ring splitting means comprises a fracture split to provide a non-overlapping butt joint.

11. A double packing containment assembly for sealing an operating member in a housing with fluid said assembly being subjected to changing thermal conditions and comprising:

live loading means for spring loading said packing;

first and second packing containment assemblies mounted in spacial separation on said operating member, each of said packing containment assemblies including, (a) a V-type PTFE packing ring in sealing engagement with said operating member and with said housing under said spring loading, said V-type PTFE packing ring having opposite end surfaces at least one of which comprises a V profile and said V-type PTFE packing ring being subjected to changing thermal conditions and moving axially on said operating member in response to said changing thermal conditions, (b) restraining ring means for permitting said V-type PTFE packing rings to expand and contract axially in response to said changing thermal conditions while, (i) enabling said live loading means to follow said V-type PTFE packing rings axial movement during said changing thermal conditions to maintain said sealing engagement, and (ii) inhibiting extrusion of said V-type PTFE packing ring, said restraining ring means including, a pair of zero clearance anti-extrusion rings mounted on said operating member with a respective ring engaging each of said opposite end surfaces of said V-type PTFE packing rings, each of said zero clearance anti-extrusion rings including, (1) an inside diameter slightly less than the outside diameter of said operating member to form an interference fit between said ring and said operating member to prevent extrusion of said V-type PTFE packing between said inner diameter and the operating member, (2) an outside diameter slightly less than the inside diameter of said housing sufficient to enable free axial movement of said ring outer diameter with respect to said housing and enable said live loading means to follow any movement of said V-type PTFE packing in response to said changing thermal conditions, and (3) a scarf cut through said ring providing an overlapping joint and enabling mounting of said ring on said operating member and enabling free axial movement of said ring inner diameter with respect to said operating member so that said live loading means can follow any movement of said V-type PTFE packing in response to said changing thermal conditions, (c) said respective zero clearance anti-extrusion ring engaging said V-type PTFE packing ring end surface having said V-type profile, including a matching V-type profile conforming therewith; and a lantern ring mounted on said operating member intermediate said first and second packing containment assemblies.

12. In a fluid valve including a valve housing, an elongated operating member movable in said housing for controlling the flow of fluid, PTFE packing surrounding said operating member for sealing engagement with said operating member to inhibit fluid leakage around said operating member, said PTFE packing being subjected to changing thermal conditions and moving axially on said operating member in response to said changing thermal conditions, and loading means for exerting and maintaining a load on said PTFE packing, the improvement comprising:

restraining ring means for permitting said PTFE packing to expand and contract axially in response to said changing thermal conditions while, (a) enabling said loading means to follow said PTFE packing axial movement during said changing thermal conditions to maintain said sealing engagement, and (b) inhibiting extrusion of said PTFE packing, said restraining ring means including, a pair of zero clearance anti-extrusion rings mounted on said operating member with a respective ring on each opposite end of said PTFE packing being subjected to said loading means, each of said rings including, (1) an inside diameter slightly less than the outside diameter of said operating member to form an interference fit between said ring and said operating member to prevent extrusion of said polymer packing between said inner diameter and the operating member, (2) an outside diameter slightly less than the inside diameter of said housing sufficient to enable free axial movement of said ring outer diameter with respect to said housing and enable said loading means to follow any movement of said PTFE packing in response to said changing thermal conditions, and (3) ring splitting means through said ring circumference for enabling mounting of said ring on said operating member and for enabling free axial movement of said ring inner diameter with respect to said operating member so that said loading means can follow any movement of said PTFE packing in response to said changing thermal conditions.

13. The improvement of claim 12, wherein said fluid valve includes a second set of PTFE packing mounted on said operating member spacially separated from said first PTFE packing and with a lantern ring therebetween, and a second pair of said zero clearance anti-extrusion rings mounted on said operating member with a respective ring on each opposite end of said second set of PTFE packing.

* * * * *